United States Patent [19]

Falleroni et al.

[11] Patent Number: 4,824,712
[45] Date of Patent: Apr. 25, 1989

[54] TREATMENT OF GLASS TO REDUCE VENTING DURING THERMAL TREATMENT AND A GLASS ARTICLE MADE THEREBY

[75] Inventors: Charlene A. Falleroni, New Kensington; Chia-Cheng Lin, Gibsonia, both of Pa.

[73] Assignee: PPG Industries, Inc., Pittsburgh, Pa.

[21] Appl. No.: 785,431

[22] Filed: Oct. 8, 1985

Related U.S. Application Data

[63] Continuation-in-part of Ser. No. 631,050, Jul. 16, 1984, abandoned.

[51] Int. Cl.⁴ .................. C03B 23/02; C03B 23/26
[52] U.S. Cl. .................................. 428/137; 65/28; 65/36; 65/60.8; 428/140; 428/409; 428/410
[58] Field of Search ................. 65/28, 36, 60.8; 428/137, 409, 427, 140, 410

[56] References Cited

U.S. PATENT DOCUMENTS

| | | | |
|---|---|---|---|
| 3,287,201 | 11/1966 | Chisholm et al. | 161/1 |
| 3,498,773 | 3/1970 | Grubb et al. | 65/30 |
| 3,765,859 | 10/1973 | Seymour | 65/114 |
| 4,416,930 | 11/1983 | Kelly | 428/137 |

OTHER PUBLICATIONS

Falleroni et al., p. 713–General Inorganic Chemistry by Sneed et al., 1942, Van Nostrand Co.

Primary Examiner—Arthur Kellogg
Attorney, Agent, or Firm—Donna L. Seidel

[57] ABSTRACT

A method and composition for coating scored regions or holes in glass articles prior to heat treatment in order to maintain residual compressive stresses and reduce venting are disclosed. The method and composition of the present invention utilize silica-containing sols which gel and density and ultimately form glassy films during the heat treatment of the coated glass articles.

18 Claims, 1 Drawing Sheet

TREATMENT OF GLASS TO REDUCE VENTING DURING THERMAL TREATMENT AND A GLASS ARTICLE MADE THEREBY

BACKGROUND OF THE INVENTION

Cross-Reference to Related Application

This application is a continuation-in-part of U.S. application Ser. No. 631,050 filed July 16, 1984, now abandoned.

1. Field of Invention

The present invention relates to treatment of glass sheets, and particularly to decreasing the frequency of venting in glass sheets during thermal treatment such as tempering.

2. Description of the Problem

Tempered glass sheets are commonly used in many applications. In fabrication, the glass is generally scored, drilled, heated, formed and quenched. These scored and drilled regions are highly susceptible to fracture or venting during such thermal treatment. More particularly, during tempering, glass is heated to a temperature greater than its strain point. After the glass has reached this condition, it is rapidly cooled or quenched setting up temporary internal stresses in the glass. The stresses may become so severe that the glass fractures. It is frequently observed that venting originates from scored or drilled regions in the glass.

Many motor vehicles have movable tempered glass windows which require drilled holes for connections to opening and closing actuator mechanisms. In drilling holes, a drill on one side of the glass sheet bores approximately halfway through the glass thickness. As it is removed, a drill on the other side of the glass sheet bores through to complete the hole. As a result, there is a rough parting line on the inner hole wall caused by mid-plane core breakout. This is the weakest area of the hole, and it must withstand extremely high tension stresses that develop during tempering. In addition, these windows are usually cut to irregular shapes. Unless considerable attention is given to seaming the edge of the window or smoothing the inner hole wall, vents will tend to occur along the window edge and hole region during thermal treatment.

U.S. Pat. No. 4,416,930 to Kelly, the disclosure of which is incorporated herein by reference, recognizes that venting is a problem associated with glass breakage during thermal treatment operations. Kelly discloses the use of a sodium silicate composition to coat scored and drilled regions of a glass sheet to decrease the frequency of venting. Although the sodium silicate coating decreases venting, thus increasing yield, the residual compressive edge stress at a sodium silicate coated hole is lower than that for an untreated hole.

U.S. Pat. No. 3,765,859 to Seymour discloses protecting a portion of the peripheral edge of glass prior to heat treating with a composition having a low coefficient of thermal expansion compared to glass and/or a heat transfer coefficient not greater than glass. The glass is heated to an elevated temperature and then rapidly cooled by contacting it with a liquid quenching medium. The treating composition typically contains silica, alumina, lithium, lead, and boron.

U.S. Pat. No. 3,498,773 to Grubb et al discloses a method of strengthening glass by ion exchange. The glass is coated in the desired area with an aqueous composition containing an alkali metal salt before heat treating. Grubb et al. replaces lithium or potassium ions in the glass with the alkali metal ions of the salt.

U.S. Pat. No. 3,287,201 to Chisholm et al also discloses a method of strengthening glass by replacing the alkali metal ions in the glass surface with selected smaller electropositive metal ions during thermal treatment.

The present invention provides a method for minimizing or eliminating venting during thermal treatment of glass sheets with drilled holes that does not have the limitations of the previously discussed references.

SUMMARY OF THE INVENTION

This invention relates to a method of minimizing or eliminating the venting of thermally treated soda-lime-silica glass sheets by applying to any scored region prior to thermal treatment a sol composition, prepared from a metal alkoxide, which gels and ultimately forms a glassy coating at a temperature below the melting temperature of the glass sheet. For the sake of simplicity, the term scored region refers to any area subjected to a cutting tool, be it a circular scored region from a drill used for boring a hole in the glass sheet or a linearly scored region. As the glass sheet is heated, the coating composition fills in any cracks or imperfections at the surface of the scored region. During heating, the coating composition polymerizes into a glass that fuses with the glass sheet surface thus healing imperfections. The residual compressive stress in the coated scored region after thermal treatment will approximately equal the residual compressive stress of an untreated scored region subject to the same thermal treatment.

DETAILED DESCRIPTION OF THE PREFERRED EMBODIMENT

Figure 1:
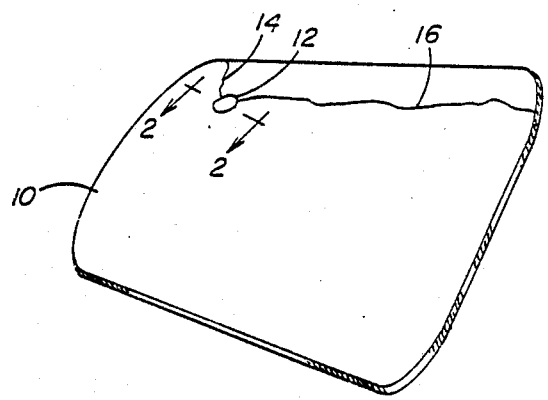
FIG. 1 is a view of a major surface of an irregularly shaped glass piece illustrating venting paths originating from a hole in the glass piece.

FIG. 1 shows an irregularly shaped glass sheet 10 with hole 12 drilled therethrough. In general, fractures originate at the hole 12 and extend to an edge of the glass sheet 10, e.g., as shown in FIG. 1. Fracture lines 14 and 16 illustrate venting paths that commonly occur when the glass sheet 10 is subjected to thermal treatment such as tempering.

Figure 2:
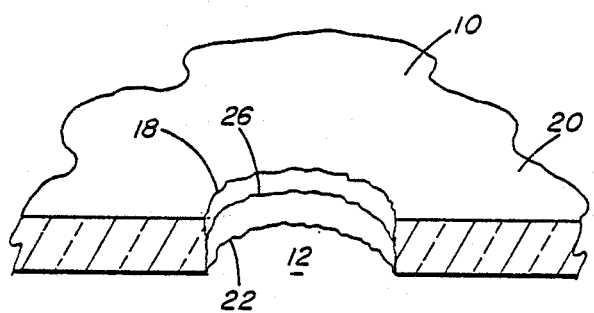
FIG. 2 is a view taken through line 2—2 in FIG. 1 illustrating the rough edges at each glass surface and at the mid-plane core breakout.

FIG. 2 illustrates the rough edges usually associated with a drilled hole. Rough edge 18 on glass surface 20 at the hole 12 results from a drill (not shown) boring through the surface 20 to approximately halfway through the glass sheet 10. Rough edge 22 on glass surface 24 results from a second drill (not shown) completing the hole by boring through the surface 24 and remaining glass. Edge 26 is the mid-plane breakout edge which may be caused by any misalignment of the drills such that the bores through each half of the glass are not colinear.

Figure 3:
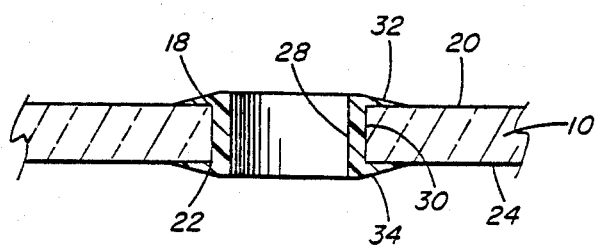
FIG. 3 is a cross-section of a drilled hole coated with a sol-gel coating composition in accordance with the teachings of this invention.

In a preferred embodiment of this invention, a silica-containing sol-gel composition is applied to the hole and surrounding region. Referring to FIG. 3, the sol-gel composition 28 coats the inner wall 30 of the hole 12, thus covering the breakout edge 26. To insure that the edges 18 and 22 are also fully coated, the sol-gel composition 28 also coats the glass surfaces 20 and 24 with coating collars 32 and 34, respectively, in the immediate vicinity of the hole 12.

A sol is prepared by at least partially hydrolyzing a metal alkoxide with a small amount of water in an organic solvent base, preferably alcohol. For the silicon-containing compositions of the present invention, a preferred alkoxide is tetraethylorthosilicate. The sol may comprise additional metals such as boron, sodium and/or titanium, which may be added as metal alkoxides such as sodium methoxide and titanium isopropoxide or as inorganic compounds such as boric anhydride. As the organic solvent evaporates and inorganic polymerization proceeds, the sol forms a gel. Upon sufficient heating, the gel densifies, ultimately to yield a glassy composition which is fused to the coated hole surface of the glass substrate.

In a particularly preferred embodiment, a silicon alkoxide, preferably tetraethylorthosilicate (TEOS), is partially hydrolyzed with one mole of water per mole of TEOS. Preferably, the TEOS, a small amount of inorganic acid, such as nitric acid, and one mole of water per mole of TEOS are heated in alcohol at a temperature of about 50° to 55° C. for about 30 minutes. To the partially hydrolyzed TEOS sol is added a titanium alkoxide, preferably titanium isopropoxide, in an appropriate amount to provide the desired final ratio of $SiO_2:TiO_2$. After continued heating at 50° to 55° C. for about 30 minutes, additional water is added to fully hydrolyze the alkoxides. Preferably, the additional water is mixed with an equal volume of alcohol and is added in aliquots with mixing and heating continued between additions. After heating the fully hydrolyzed composition, a clear sol is produced which may be applied to the scored glass surface.

In another particularly preferred embodiment of this invention, a silica-boron sol-gel composition is applied to the scored region of the hole in sol form. After applying the sol-gel composition, the coated area is air dried prior to thermal treatment of the glass. There is no minimum coating thickness required in the application of the sol-gel nor is there any pretreatment of the region to be coated.

After drying, the coated scored glass is subjected to thermal treatment. In the instance of tempering, the glass is typically heated to a temperature in the vicinity of 1200° F. (650° C.) and then rapidly air chilled to a temperature below its strain point. The quenching causes a temporary temperature gradient from the surfaces of the glass towards the center, and temporary internal stresses that result in a surface region stressed in compression surrounding an interior region stressed in tension. This stress condition is normally associated with tempering. During heating, the sol-gel composition polymerizes, densifies and fuses to form a glassy coating. The glass thus formed has a lower viscosity than the glass sheet and will flow into any coated flaws, cracks, or chips. The polymer fuses with the adjoining glass sheet surface in these regions, healing the imperfections so as to reduce the tendency for the glass sheet to vent when it is subjected to the high stresses developed during thermal treatment.

During thermal treatment, the glassy coating does not restrict or adversely affect the tempering of the glass region that it coats, so that the residual compressive edge stresses in the coated region are comparable with scored regions of untreated tempered glass.

TESTING

The following coatings were tested to evaluate the effectiveness of each coating material in preventing venting and maintaining residual compressive edge stress of a drilled and tempered glass sheet.

Coating No. 1—Sodium Silicate Solution

The sodium silicate solution, $Na_2O.SiO_2$, used in the testing was purchased from Fisher Scientific, Pittsburgh, Pa., under stock designation No. SO-S-338. The sodium silicate solution was applied as taught in U.S. Pat. No. 4,416,930 to Kelly.

Coating No. 2—Silica-Titanium Sol-Gel

A sol was prepared by mixing 101.89 grams of reagent alcohol, 5.66 grams of deionized water and 1.18 grams of nitric acid at room temperature, adding 50.34 grams of tetraethyl orthosilicate, heating at 53° C. for 15 minutes in a water bath, adding 7.64 grams of titanium i-proproxide, and heating the final composition at 53° C. for one hour. This sol will gel and ultimately yield a glassy composition with a molar ratio of 90% $SiO_2$ and 10% $TiO_2$.

Coating No. 3—Lithium Silicate Solution

The lithim silicate solution, $Li_2O.SiO_2$, used in the testing was purchased from Lithium Corporation of America, Bessemer City, N.C. under the designation Lithsil-6. The lithium silicate solution does not produce a sol-gel composition.

Coating No. 4—Silica Sol-Gel

A sol was prepared by mixing 0.9 grams of deionized water and 99.1 grams of 2-propanol, heating to 53° C. using a water bath for uniform heating, adding 21.0 grams of tetraethyl orthosilicate and 0.42 grams of glacial acetic acid, and heating final mixture at 53° C. for 30 minutes. Other acids may be used in place of glacial acetic acid: 0.22 grams of nitric acid or 0.9 grams of dichloroacetic acid. This 5 percent solids sol will gel and ultimately yield a glassy silica composition.

Coating No. 5—Silica-Boron Sol-Gel

A sol was prepared by heating 349.8 grams of reagent alcohol to 53° C. in a covered glass container with a stirring apparatus using a water bath for uniform heating, adding 125 grams of tetraethyl orthosilicate, 0.5 grams of nitric acid and 10.8 grams of deionized water, heating at 53° C. for 15 minutes, adding 13.9 grams of boric anhydride to the mixture, and heating at 53° C. for 30 minutes. After heating, the mixture was cooled and stored in tightly sealed containers. This 10 percent solids sol will gel and ultimately yield a glass composition comprising a molar ratio of 75% $SiO_2$ and 25% $B_2O_3$.

Coating No. 6—Silica-Sodium-Titanium Sol-Gel

A sol was prepared by mixing 345.0 grams of methanol, 2.31 grams of deionized water and 26.75 grams of tetraethyl orthosilicate at room temperature; mixing 33.91 grams of methanol and 1.74 grams of sodium methoxide and adding to the first mixture; and finally adding 4.57 grams of titanium i-propoxide. This 10 percent solids sol will gel and ultimately yield a glassy composition with a molar ratio of 80% $SiO_2$, 10% $Na_2O$ and 10% $TiO_2$.

Coating No. 7—Silica-Sodium Sol-Gel

A sol was prepared by mixing 73.92 grams of methanol, 20.11 grams of tetraethyl orthosilicate, 2.38 grams of deionized water and 3.59 grams of sodium methoxide at room temperature. This 7.75 percent solids sol will gel and ultimately yield a glassy composition with a molar ratio of 75% $SiO_2$ and 25% $Na_2O$.

TEST I

The objective of Test I was to produce venting in drilled holes to test the effectiveness of selected coatings in preventing venting. Four hundred eighty three curved quarter windows of 3.2 mm SOLEX ® float glass were tested. Four groups of samples were coated with a $SiO_2$ sol-gel, a $SiO_2$-$TiO_2$ sol-gel, a lithium silicate solution, and a sodium silicate solution. These four groups were tested along with one group of uncoated plates (regular holes) as a control group.

The glass plates were 6½"×17 ⅜"×9½"×18". Two ½ inch holes were drilled approximately 1½" from the lower corners of each plate and coated prior to tempering. The plates were tong tempered in pairs, as required for the right and left hand window parts, and press bent. Two plates of each test group were processed at a time, alternating the coated and control test groups through the furnace.

The furnace exit temperature was 1275° F. (about 691° C.) with furnace speed at 185 inches (about 4.7 meters) per minute. At these conditions, the glass was in the furnace 2.15 minutes and entered the air quench 7.9 seconds after exiting the furnace. Air pressures were 18 and 27 oz/in² right and left in quench plenums. Typical process venting conditions were successfully produced by the heating and cooling cycle to effectively evaluate the hole coatings.

TABLE I
PERCENT HOLE YIELDS FOR DIFFERENT COATINGS OF ½ INCH HOLES IN 3.2 mm SOLEX ® GLASS

| Coating | No. of Plates Tested | No. of Holes | No. of Vented holes | % Hole Yields |
|---|---|---|---|---|
| Sodium Silicate | 98 | 196 | 1 | 99.5 |
| 90% $SiO_2$—10% $TiO_2$ Sol Gel | 100 | 200 | 32 | 84 |
| Lithium Silicate | 101 | 202 | 57 | 71.8 |
| $SiO_2$ Sol-Gel | 100 | 200 | 58 | 71 |
| Control-Uncoated Holes | 84 | 168 | 75 | 55.4 |

Table I above presents a summary of the test results, showing the number of vents produced at the plate hole locations during quenching for the various test groups and the percentage hole yields. Any visible crack at the hole was considered to be a vent and thus a defect. As indicated on the control samples, extensive hole venting occurred upon quenching. Of the uncoated holes, 55 percent vented. The best venting performance was obtained when using the sodium silicate coating on the holes, with 99.5 percent hole yield. The second best performance was obtained when using the 90% $SiO_2$-10% $TiO_2$ sol-gel coating, with 84 percent hole yield. With the $SiO_2$ sol-gel and lithium silicate coated hole plates, lower test results were obtained, with yields of 71 and 72 percent respectively, indicating some improvement in comparison with the uncoated control holes.

TABLE II
RESIDUAL COMPRESSIVE EDGE STRESS FOR DIFFERENT COATINGS OF ½ INCH HOLES IN 3.2 mm SOLEX ® GLASS

| Coatings | Ave. Residual Compressive Edge Stress (PSI) |
|---|---|
| Sodium Silicate | 6595 |
| 90% $SiO_2$ 10% $TiO_2$ Sol-Gel | 13915 |
| Lithium Silicate | 11598 |
| $SiO_2$ Sol-Gel | 14015 |
| Control Uncoated Holes | 13970 |

Table II shows the average residual compressive edge stress on the tempered plates measured at the drilled holes. The control, $SiO_2$, $SiO_2$ $TiO_2$, and lithium silicate coated plates all showed quartz wedge edge compression stress values at the holes of over 10,000 psi, which is considered the minimum allowable for fully tempered glass. Hole edge compressive stress values measured on the sodium silicate coated plates were only about half or even less than half compared to the control untreated holes, indicating a substantial edge strength decrease.

Test II

Test II was conducted to examine the effectiveness of additional sol-gel coating compositions in coating ½ inch drilled holes before tempering automotive 3.2 mm (0.128 inch) SOLEX ® float glass quarter windows.

Four hundred and eighty curved quarter window lights of the type used in Test I were tested. The sol-gel compositions tested included: 75% $SiO_2$-25% $B_2O_3$; 75% $SiO_2$-25% $Na_2O$, and 80% $SiO_2$- 10% $Na_2O$-10%

TiO$_2$. These three test groups were tested along with the standard sodium silicate solution. One group of uncoated plates (regular holes) was run as a control group.

On each plate, two ½ inch holes were drilled 1½" from the top edge corners and coated prior to tempering. The coating composition was dried at room temperature for several hours before tempering. The plates were vertically tong-tempered in pairs, as required for the right and left hand window parts, and press bent. Two plates of each coated test group were processed at a time, run through the furnace intermittently with the uncoated control plates.

Furnace exit temperature was recorded as 1275° F. (about 691° C.). It is believed that the actual temperature may have been 10° to 20° F. lower. At these conditions, the glass was in the furnace 2.15 minutes and air quenched 7.9 seconds after exiting the furnace. Air pressures were 18 and 27 oz/in$^2$ right and left in the quench plenums. The object was to process the glass at similar tempering conditions as existed in Test I.

Severe process venting conditions, attributed to a lower furnace exit temperature, developed at quenching during the test trial, but it was determined that this test would nonetheless be effective for the evaluation of the hole coatings.

TABLE III

PERCENT YIELDS FOR DIFFERENT COATINGS OF ½ INCH HOLE IN 3.2 mm SOLEX ® GLASS

| Coatings | No. of Plates Tested | No. of Holes | No. of Vented Holes | % Hole Yields |
|---|---|---|---|---|
| Sodium Silicate | 100 | 200 | 39 | 80.5 |
| 75% SiO$_2$—25% B$_2$O$_3$ Sol-Gel | 100 | 200 | 41 | 79.5 |
| 80% SiO$_2$—10% Na$_2$O—10% TiO$_2$ Sol-Gel | 100 | 200 | 93 | 53.5 |
| 75% SiO$_2$—25% Na$_2$O Sol-Gel | 100 | 200 | 119 | 40.5 |
| Control Uncoated Holes | 80 | 160 | 103 | 36 |

Table III above is a summary of the test results. On the uncoated control samples, extensive hole venting occurred at quenching, resulting in 103 vents in 160 holes for a percentage hole yield of 36%. The test group of SiO$_2$-B$_2$O$_3$ sol-gel coated holes showed substantial improvement, with a percentage hole yield of 79.5%. This performance was comparable to the performance of sodium silicate coated hole plates, which had a yield of 80.5%. Significant improvement was achieved using the SiO$_2$-Na$_2$O and SiO$_2$-Na$_2$O-TiO$_2$ sol-gel coatings with yields of 40.5% and 53.5%, respectively.

TABLE IV

RESIDUAL COMPRESSIVE EDGE STRESS FOR DIFFERENT COATINGS OF ½ INCH HOLES IN 3.2 mm SOLEX ® GLASS

| Coatings | Ave. Residual Compressive Edge Stress (PSI) |
|---|---|
| Sodium Silicate | 6468 |
| 75% SiO$_2$—25% B$_2$O$_3$ Sol-Gel | 12943 |
| 80% SiO$_2$—10% Na$_2$O—10% TiO$_2$ Sol-Gel | 12200 |
| 75% SiO$_2$—25% NaO$_2$ Sol-Gel | 13890 |
| Control-Uncoated Holes | 12568 |

Average quartz wedge edge residual compressive stress values measured at the drilled holes are shown in Table IV. Values at the holes on the control and sol-gel coated plates ranged from 12200 to 13890. Edge stress values measured at the holes coated with sodium silicate were only half as high or less, indicating a significant decrease of strength.

It is believed that the disadvantageous lowering of residual compressive edge stress associated with the use of the sodium silicate coating is due to its insulating properties. With sodium silicate, a white foam forms at the holes during firing, apparently restricting cooling at the edges and thereby reducing the edge compression development. This coating appears to provide a thermal insulating effect by reducing the tension stresses that develop during quenching. As a result, the coated area is not tempered to the same extent as the uncoated region of glass.

The overall best results were obtained with the 75% SiO$_2$-25% B$_2$O$_3$ sol-gel composition, which gave both a high percentage hole yield and high residual compressive edge stresses. The expected shelf life of the silica-boron sol-gel as prepared herein is two months for optimum results.

According to the silica-boron phase diagram, silica-boron glass with a 75%/25% ratio melts and fuses at approximately 1960° F. (about 1071° C.). It was found in testing that the 75% SiO$_2$-25% B$_2$O$_3$ sol-gel coating did in fact melt and fuse during tempering at a glass surface temperature estimated to be 1200° F. (about 649° C.). Extrapolating this temperature relationship to a tempering operation with a maximum glass surface temperature estimated to be 1300° F. (about 704° C.), it is believed that a sol-gel composition with a molar ratio of 80% SiO$_2$ and 20% B$_2$O$_3$ would give results comparable to that of the tested 75% SiO$_2$-25% B$_2$O$_3$ sol-gel composition.

Microscopic examination of tempered glass with silica-boron sol-gel coatings of varying molar percentages shows that where the sol-gel is less than 55% SiO$_2$, there is not enough silica to form a coating on the glass.

As a result, the glass is coated with $B_2O_3$ particles rather than a glassy coating. It is believed that a 55% $SiO_2$-45% $B_2O_3$ sol-gel composition is the lower limit for silica-boron sol-gels to attain results comparable to the tested 75% $SiO_2$-25% $B_2O_3$ sol-gel composition.

The other tested sol-gel compositions also produced high residual compressive edge stresses, although the hole yields were lower than the hole yields for the silica-boron sol-gel compositions. These lower percentage hole yields may indicate that some sol-gel compositions require a temperature higher than that reached in normal glass tempering in order to densify and form a glassy coating. Therefore, higher percentage hole yields would be expected for these other sol-gel compositions at higher tempering temperatures.

It should be noted that the tests were conducted on SOLEX® glass. The principle difference between SOLEX® glass and clear float glass is that the former has a higher iron content. It is expected that application of the tested coatings will result in the same outcome for both SOLEX® glass and clear float glass.

The treated glass sheet may also be shaped and/or exposed to a film forming composition between the heating step and the rapid cooling step of a tempering operation. Also, if desired, a glass sheet having a scored region that is to be annealed rather than tempered, with or without the other processing steps such as shaping and/or coating, may have its scored region treated with a sol-gel composition prior to the thermal treatment of heating followed by a more gradual controlled cooling.

While preferred embodiments of the invention have been illustrated and described herein, variations become apparent to one of ordinary skill in the art. Accordingly, the invention is not to be limited to the specific embodiments described herein, and the true scope and spirit of the invention are to be determined by reference to the claims.

I claim:

1. A method of heat treating a glass sheet having a scored region comprising the steps of:
   a. coating said scored region with a sol composition prepared from an alkoxide and comprising silicon;
   b. hydrolyzing said alkoxide and polymerizing to form a gel;
   c. heating said glass sheet to a temperature above its strain point and below its melting point and sufficient to cause said gel to densify;
   d. maintaining said temperature for a sufficient time to cause said gel to form a glassy coating; and
   e. cooling said glass sheet.

2. A method according to claim 1, wherein said sol comprises silicon and at least one metal selected from the group consisting of titanium, boron and sodium.

3. A method according to claim 2, wherein said coating has a molar ratio of 75 to 80 percent $SiO_2$ and 10 to 25 percent $Na_2O$.

4. A method according to claim 1, wherein said scored region comprises a hole, having a circumferential wall, extending through the thickness of said glass sheet, and said coating step includes coating said circumferential wall of said hole.

5. A method according to claim 4, wherein said coating step further includes coating a portion of each surface of said glass sheet immediately adjacent to said hole.

6. A method according to claim 5, further including the step of shaping said glass sheet to a desired shape between said heating and cooling steps.

7. The method as in claim 1, wherein the cooling in said cooling step is rapid enough to impart a temper in said glass sheet.

8. A method of heat treating a glass sheet having a scored region comprising the steps of:
   a. coating said scored region with a sol composition prepared from an alkoxide and comprising silicon and boron;
   b. hydrolzying said alkoxide and polymerizing to form a gel;
   c. heating said glass sheet to a temperature above its strain point and below its melting point and sufficient to densify said gel;
   d. maintaining said temperature for a sufficient time to cause said gel to form a glassy coating; and
   e. cooling said glass sheet,
wherein said coating has a molar ratio of 55 to 80 percent $SiO_2$ and 20 to 45 percent $B_2O_3$.

9. A method of heat treating a glass sheet having a scored region comprising the steps of:
   a. coating said scored region with a sol composition prepared from an alkoxide and comprising silica and at least one metal selected from the group consisting of titanium, boron and sodium, which sol forms a gel;
   b. heating said glass sheet to a temperature above its strain point and below its melting point and sufficient to cause said gel to densify;
   c. maintaining said temperature for a sufficient time to cause said gel to form a glassy coating; and
   d. cooling said glass sheet,
wherein said coating has a molar ratio of 75 to 90 percent $SiO_2$ and 10 to 25 percent $TiO_2$.

10. A tempered glass article comprising a glass sheet having at least one hole extending entirely through its thickness, and a sol-gel coating fused to the wall of said hole, wherein said coating comprises $SiO_2$ and $B_2O_3$.

11. A tempered glass article according to claim 10, wherein said coating has molar percentage ranges of 55 to 80 percent $SiO_2$ and 20 to 45 percent $B_2O_3$.

12. A tempered glass article comprising a glass sheet having at least one hole extending entirely through its thickness, and a sol-gel coating comprising silica fused to the wall of said hole and coating a portion of each surface of said glass sheet immediately adjacent to said hole, wherein said coating has molar percentages of 75 to 80 percent $SiO_2$ and 10 to 25 percent $Na_2O$.

13. A tempered glass article comprising a glass sheet having at least one hole extending entirely through its thickness, and a sol-gel coating comprising silica fused to the wall of said hole and coating a portion of each surface of said glass sheet immediately adjacent to said hole, wherein said coating has molar percentages of 75 to 90 percent $SiO_2$ and 10 to 25 percent $TiO_2$.

14. A method of heat treating a glass sheet having a scored region comprising the steps of:
   coating said scored region with a sol-gel composition comprised essentially of boron and silica compositions and having a viscosity lower than that of said glass sheet;

heating said glass sheet to a temperature above its strain point and below its melting point and sufficient to cause said sol-gel to flow over said coated scored region;

maintaining said temperature for a sufficient time to allow said sol-gel to flow and fill any imperfections in said coated scored region; and cooling said glass sheet.

15. A method according to claim 14, wherein said sol-gel has a molar ratio of 55 to 80 percent $SiO_2$ and 20 to 45 percent $B_2O_3$.

16. A tempered glass article comprising a glass sheet having at least one hole extending entirely through its thickness, and a sol-gel coating essentially containing silica and boron compositions bonded to the wall of said hole.

17. A tempered glass article according to claim 16, wherein said coating comprises 55 to 80 percent $SiO_2$ and 20 to 45 percent $B_2O_3$.

18. A tempered glass article according to claim 17, wherein said coating comprises $SiO_2$ and $B_2O_3$ in a molar ratio of 75 to 25.

* * * * *